(12) United States Patent
Byrne et al.

(10) Patent No.: US 10,162,892 B2
(45) Date of Patent: Dec. 25, 2018

(54) IDENTIFYING INFORMATION ASSETS WITHIN AN ENTERPRISE USING A SEMANTIC GRAPH CREATED USING FEEDBACK RE-ENFORCED SEARCH AND NAVIGATION

(75) Inventors: Brian P. Byrne, Austin, TX (US);
Martin A. Oberhofer, Bondorf (DE);
Sushain Pandit, Austin, TX (US);
Charles D. Wolfson, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/037,187

(22) Filed: Feb. 28, 2011

(65) Prior Publication Data

US 2012/0221558 A1 Aug. 30, 2012

(51) Int. Cl.
*G06F 17/30* (2006.01)
*G06Q 10/06* (2012.01)

(52) U.S. Cl.
CPC ....... *G06F 17/30864* (2013.01); *G06Q 10/06* (2013.01)

(58) Field of Classification Search
None
See application file for complete search history.

(56) References Cited

U.S. PATENT DOCUMENTS

| | | | |
|---|---|---|---|
| 3,617,714 A * | 11/1971 | Kernighan | G06F 17/5072 716/123 |
| 6,477,524 B1 * | 11/2002 | Taskiran et al. | 707/2 |
| 6,714,975 B1 * | 3/2004 | Aggarwal et al. | 709/224 |
| 6,931,604 B2 * | 8/2005 | Lane | 715/853 |
| 6,947,924 B2 * | 9/2005 | Bates et al. | 707/708 |
| 7,493,319 B1 | 2/2009 | Dash et al. | |
| 7,571,177 B2 | 8/2009 | Damle | |
| 7,657,522 B1 * | 2/2010 | Puzicha et al. | 707/723 |

(Continued)

FOREIGN PATENT DOCUMENTS

| | | | |
|---|---|---|---|
| JP | 2010176198 A | 8/2010 | |
| WO | WO2010139091 A1 * | 9/2010 | G06F 17/30 |

OTHER PUBLICATIONS

"PHP Classes: Semantic pagination," PHP Classes, Icontem: pp. 1-2, <http://www.phpclasses.org/package/2372-PHP-Generate-links-to-browse-lists-split-into-pages.html>.

(Continued)

*Primary Examiner* — Grace Park
*Assistant Examiner* — Cheryl M Shechtman
(74) *Attorney, Agent, or Firm* — Patterson + Sheridan, LLP

(57) ABSTRACT

Embodiments of the invention provide an approach for creating, evolving and using a weighted semantic graph to manage and potentially identify certain information assets within an enterprise. The semantic graph may be generated by monitoring users navigating through search results which provide a set of information assets responsive to a search query. By recording the navigation path taken by many users, relationships between information assets may be identified. Further, once generated, the semantic graph may be used to present users with an indication of related information assets as part of the search results. Further still, the semantic graph may also be used to identify information assets "hubs" as well as information assets that may provide low utility to individuals within the enterprise.

19 Claims, 8 Drawing Sheets

(56) References Cited

U.S. PATENT DOCUMENTS

| | | | |
|---|---|---|---|
| 7,774,383 | B2 | 8/2010 | Acevedo-Aviles et al. |
| 8,386,495 | B1* | 2/2013 | Sandler ............. G06F 17/30958 707/748 |
| 2003/0208399 | A1* | 11/2003 | Basak et al. ..................... 705/14 |
| 2006/0235841 | A1 | 10/2006 | Betz et al. |
| 2008/0086451 | A1 | 4/2008 | Torres et al. |
| 2009/0024615 | A1 | 1/2009 | Pedro et al. |
| 2009/0106244 | A1 | 4/2009 | Dash et al. |
| 2009/0112838 | A1 | 4/2009 | Eggebraaten et al. |
| 2009/0119262 | A1 | 5/2009 | Guo et al. |
| 2009/0164387 | A1* | 6/2009 | Armstrong ............ G06F 17/241 705/36 R |
| 2009/0164441 | A1 | 6/2009 | Cheyer |
| 2009/0265373 | A1 | 10/2009 | Acevedo-Aviles et al. |
| 2010/0023474 | A1 | 1/2010 | Kejariwal et al. |
| 2010/0070448 | A1 | 3/2010 | Omoigui |
| 2012/0005199 | A1* | 1/2012 | Acharya ............ G06F 17/30864 707/723 |
| 2012/0124034 | A1* | 5/2012 | Jing et al. ..................... 707/722 |

OTHER PUBLICATIONS

Wang et al., "A Top-K Keyword Search for Supporting Semantics in Relational Databases," Journal of Software, Sep. 2008, vol. 19(9): pp. 2362-2375.

The International Search Report and Written Opinion of International Application PCT/IB2012/050821 dated May, 22, 2012.

Nobuto Inoguchi, et al. "The Desktop Search Using Relativity of Files Obtained from Access History", IPSJ SIG Technical Reports, Jul. 12, 2006, vol. 2006 No. 77, pp. 141-146, 2006-NBS-140(I), Japan. (Engish abstract).

Masashi Yamada, et al. "Extracting Relations Among Files by User's History", IEICE Technical Report, Feb. 2, 2000, vol. 99 No. 649, pp. 89-94, PPRMU99_231-245, Japan. (English abstract).

U.S. Appl. No. 13/036,799, entitled "Generating a Semantic Graph Relating Information Assets Using Feedback Re-Enforced Search and Navigation" by Brian P. Byrne et al., filed Feb. 28, 2011.

U.S. Appl. No. 13/036,834, entitled "Managing Information Assets Using Feedback Re-Enforced Search and Navigation" by Brian P. Byrne et al., filed Feb. 28, 2011.

* cited by examiner

IDENTIFYING INFORMATION ASSETS WITHIN AN ENTERPRISE USING A SEMANTIC GRAPH CREATED USING FEEDBACK RE-ENFORCED SEARCH AND NAVIGATION

BACKGROUND

Embodiments of the invention are directed to techniques for managing information assets in an enterprise environments. More specifically, embodiments of the invention provide an information asset management tool configured to capture and utilize crowd wisdom in order to identify and share relationships about information assets within the enterprise.

Organizations commonly have to manage very large-scale information systems, which can include a very large number of both interrelated and independent information assets. While information assets can vary in nature, examples include structured systems such as traditional relational databases as well as unstructured systems such as content repositories and document stores. The degree of formality with which these systems are monitored, registered and managed can vary extensively within a large enterprise. An enterprise typically manages mission-critical information systems. However, such systems are frequently outnumbered by unmanaged systems (e.g., spreadsheets, local database and document stores, as well as other information assets). More generally, it is not unusual for a large enterprise to manage thousands of distinct information repositories along with a (sometimes unknown) number of ad-hoc data stores and local working environments, which can themselves also number in the thousands. As noted, the information assets of a given enterprise are frequently not independent of one another. For example, one information asset may store data extracts from another information asset. Similarly, information assets can share processing states during data integration (or during extract, transform, and load (ETL) processes), or provide related information repositories which store equivalent information segmented by line of business, and so on. Accordingly, in many cases, understanding the relationships between assets may be as important as understanding the assets themselves.

SUMMARY

One embodiment includes a method for identifying information assets. This method may generally include evaluating, according to predefined criteria, one or more of plurality of nodes in a semantic graph, wherein the semantic graph is generated by monitoring user-behavior in accessing information assets presented in query search results by an enterprise information asset management application executed on a computing system having at least a processor and a memory. Each of the plurality of nodes corresponds to one of the plurality of information assets. The semantic graph further includes a plurality of edges, each indicating a relationship between two information assets corresponding to the nodes connected by a respective edge. The method may also include, upon determining at least a first one of the nodes in the semantic graph satisfies the predefined criteria, providing an indication of the first node.

In a particular embodiment, the predefined criteria specifies a minimum threshold edge count to/from a given one of the plurality of nodes is required to satisfy the predefined criteria. Alternatively (or additionally) the predefined criteria may specify criteria used to evaluate metadata describing a given information asset. For example, the metadata may specify an operational state of the information asset as being a formally managed asset within an enterprise or informally managed within the enterprise.

Additional embodiments include a computer-readable storage medium storing an application, which, when executed on a processor, performs the above recited method as well as a system having a processor and a memory storing an enterprise information asset management application program, which, when executed on the processor, performs the above recited method.

BRIEF DESCRIPTION OF THE DRAWINGS

So that the manner in which the above recited aspects are attained and can be understood in detail, a more particular description of embodiments of the invention, briefly summarized above, may be had by reference to the appended drawings.

It is to be noted, however, that the appended drawings illustrate only typical embodiments of this invention and are therefore not to be considered limiting of its scope, for the invention may admit to other equally effective embodiments.

DETAILED DESCRIPTION

Figure 1:
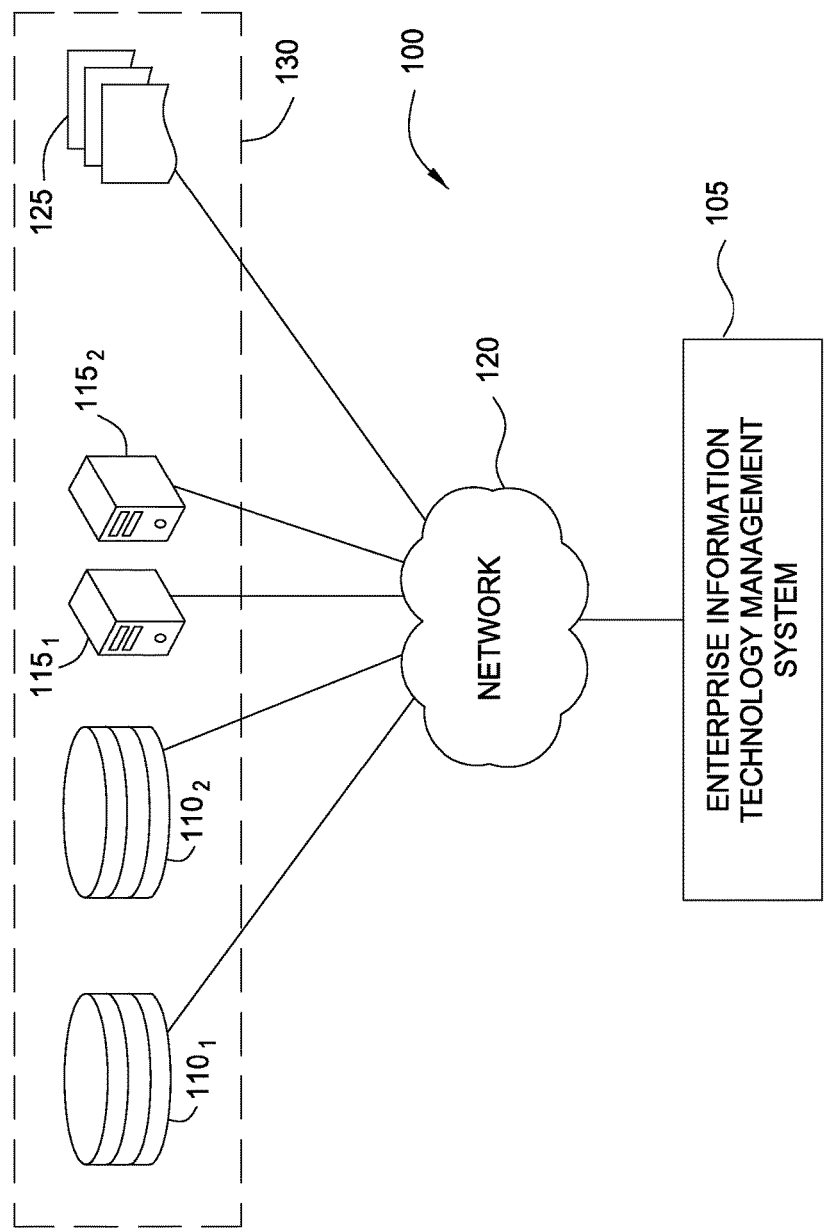
FIG. 1 illustrates an example of a distributed infrastructure having a variety of information assets, according to one embodiment of the invention.

Some enterprise-level information management systems provide a search interface which allow users to access information asset descriptions, data models, and/or other similar objects residing in a database or (or stored as metadata). Often however, the results presented using such tools result in significant ambiguity and confusion for the user, particularly for large result-sets. For example, a query result which includes a large count of returned assets can require many pages to be displayed. Further, such results may be interrelated in a variety of interesting ways not accounted for in the result set. As a result, end-users who are unaware as to how the information assets are organized can get lost in a large number of results and are forced to simply jump from one page to the other, hoping to find to the particular related assets they need. Further, when a user accesses one element of a search result, the interface does not provide any visibility to additional related assets without performing a second explicit search.

Embodiments of the invention provide techniques for creating, evolving, and accessing a weighted semantic graph to manage (and potentially identify) related information assets within an enterprise. As used herein, "information assets" broadly refers to any form of information technology used by a given enterprise (e.g., application servers, databases (and underlying tables and columns) data models, functions, jobs, scripts, ETL tools, network services, other server systems and applications, networking devices, appliance systems, etc. In one embodiment, an enterprise information management system may be configured with the appropriate tools (and metadata) needed to search for a specified set of information assets. For example, a webserver/application server/database system may be used to provide a search interface which relies on keywords. When a user searches for a given keyword (or words), information assets which match the keyword may be returned and presented to the user.

Once presented, the management tool monitors how a user interacts with the results, e.g., by monitoring a user clicking through a sequence of results. For example, if a user clicks "information asset 1" and then "information asset 2" (within a configurable time window) the management tool registers a relationship in a weighted graph between the two. When the user subsequently clicks on "information asset 3," a relationship between "information asset 2" and "information asset 3" is captured. Over time, if additional users click through the same path on search results, the weight between "information asset 1" and "information asset 2" is increased. If the weight assigned to a link reaches a user-configurable weight, then search results which include these two elements are ordered to be next to one another. When a user selects one asset, data related to or describing that asset may be presented. Further, the search interface may inform a user of what information assets are related to a selected one. In one embodiment, the search interface may access the semantic graph and identify information assets related to the selected one. Doing so may help inform the user about relationships to assets of which they were unaware—or may help them find related assets without having to hunt for them in a large set of results.

In one embodiment, the semantic graph captures relationships between assets based on user behavior, allowing the relative importance of information assets to be identified. The stronger the edge weights to an "information asset" in the semantic graph, the more important that asset is to users within the enterprise. As noted, in large organizations, managing information assets is a significant problem; in particular, where some informally managed assets or ad-hoc systems become widely used. Accordingly in one embodiment, the relative weights of the links to such an asset may be used to identify informal systems within the enterprise that are targets to bring within the enterprises' formal information management structures. Conversely, a managed asset having few links in the semantic graph (or links with low weights) indicates the asset may be underused. Such assets may be identified as candidates for being shut down, or may be investigated to learn why the given asset is underutilized.

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as JAVA™, SMALLTALK™, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g., an amount of storage space consumed by a user or a number of virtualized systems instantiated by the user). A user can access any of the resources that reside in the cloud at any time, and from anywhere across the Internet. In context of the present invention, a management tool describing a variety of information assets deployed to a computing cloud (whether the cloud itself is provided by the enterprise or a third party). For example, the monitoring application could monitor cloud based database systems, virtual machines, and a variety of other server applications.

The flowchart and block diagrams in the Figures illustrate the architecture, functionality and operation of possible implementations of systems, methods and computer program products according to various embodiments of the present invention. In this regard, each block in the flowchart or block diagrams may represent a module, segment or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Further, particular embodiments of the invention are described a particular example management tool used to monitor a collection of information assets. However, it should be understood that the techniques described herein may be adapted to a variety of purposes in addition to the uses for predictive modeling analysis. Accordingly, references to the specific embodiment are included to be illustrative and not limiting.

FIG. 1 illustrates an example of a distributed infrastructure 100 having a variety of information assets, according to one embodiment of the invention. As shown, the computing infrastructure 100 includes an enterprise information technology management system 105 and information assets 130, each connected to a communications network 120. The information assets 130 generally represent a collection of information technology resources managed by a given enterprise. In this particular example, the information assets 130 include structured systems $110_{1-2}$ (e.g., relational database systems storing enterprise data) server systems $115_{1-2}$ (e.g., web servers, other web-based services and/or applications, or unstructured data/document storage such as a content management server), and unstructured information assets 125 (e.g., spreadsheets, local databases or document stores, as well as other information assets).

As described in greater detail below, the management system 105 may be configured with the appropriate hardware and software applications needed to provide an interface to the information assets 130 managed by the enterprise. Such hardware and software applications may be configured to monitor users interacting with search results, and based on the monitoring, create and evolve a semantic graph representing the relationships between information assets 130 in the enterprise. For example, assume a search result provides a list of information assets 130 responsive to a search query. In such a case, when a user accesses successive items in the search results, a semantic graph is updated to create weighted relationships between elements in the search results. Thus, if a user first clicks on a search result listing database $110_1$ and then on an unstructured asset 125, the management tool registers between these two information assets as a weighted edge in a semantic graph between these two information assets.

Over time, if additional users navigate the same path through search results, the weight between database $110_1$ and unstructured asset 125 increases. That is, edges between information assets in the semantic graph are weighted according to the paths that previous users have followed while navigating search results. If the weight assigned to an edge between two information assets reaches a user-configurable threshold, then management system 105 may create a permanent semantic association between them. In one embodiment, however, newly created edges in the semantic graph may need to be confirmed by an administrator prior to a permanent semantic association being created. Further, edges between nodes in the semantic graph may include multiple weights, distinguished based on context. For example, context may be relative to an organizational role (e.g., a business user versus an application developer). Of course, other contexts could be used.

Once a semantic relationship is established between two nodes (i.e., between two information assets 130), the management system 105 may be configured to enhance search results by presenting users with an indication of related information assets 130, based on the semantic graph. As an example, assume a user searches for assets that relate to "customer name." Typically, customer related information will be stored in multiple information assets across the enterprise. In such a case, in addition to returning the list of assets that support "customer name," the management system 105 also assists the user in understanding related information assets 130 for their query. Thus, when a user selects a result of the "customer name" query (e.g., "Customer Mart"), they are presented with additional information assets that are related to that selected asset (perhaps "Customer ODS," "Customer Name Standardization Routines," and so on), where the additional information assets are identified identify using the semantic graph. Further, when a user related information asset, the semantic relationship between two assets may be reinforced, e.g., by increasing the weight between the "Customer Mart" information asset and the "CustomerODS" information asset.

Additionally, metadata describing information assets 130 in the semantic graph may be mapped to a domain ontology. Doing so allows additional inter-asset relationships to be identified. For example, nodes in the semantic graph lacking edges (meaning the information asset represented by such a node does not have a relationship to any other asserts) may be classified according to the domain ontology and associated with other assets. Of course, the management system 105 may allow an administrator to manually associate one asset with another in the semantic graph. In one embodiment, the edge weights may be updated dynamically, as a user navigates through search results. Alternatively, the semantic graph may be updated periodically after a certain time window or after gathering a minimum amount of asset relationship data.

Figure 2:
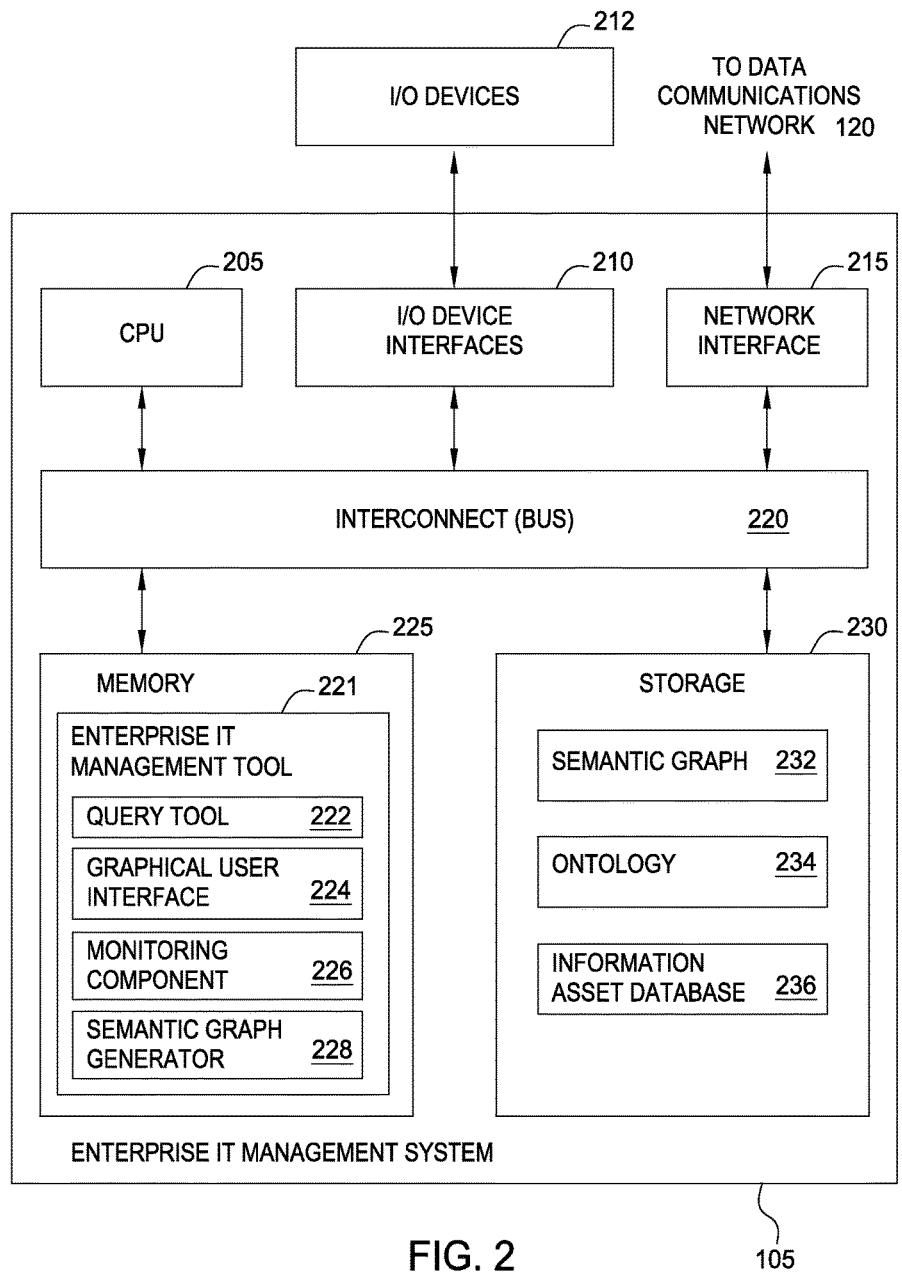
FIG. 2 illustrates an example computing system used to provide an enterprise information technology management tool, according to one embodiment of the invention.

FIG. 2 illustrates an example of the management system 105 used to provide an enterprise information technology management tool 221, according to one embodiment of the invention. As shown, the management system 105 includes, without limitation, a central processing unit (CPU) 205, a network interface 215, an interconnect 220, a memory 225, and storage 230. The computer system 200 may also include an I/O device interface 210 connecting I/O devices 212 (e.g., keyboard, display and mouse devices) to the computer system 200.

In general, the CPU 205 retrieves and executes programming instructions stored in the memory 225. Similarly, the CPU 205 stores and retrieves application data residing in the memory 225. The interconnect 220 provides a communication path for transmitting programming instructions and application data between the CPU 205, I/O devices interface 210, storage 230, network interface 215, and memory 225. CPU 205 is included to be representative of a single CPU, multiple CPUs, a CPU having multiple processing cores, and the like. And the memory 225 is generally included to be representative of a random access memory. The storage 230 may be a hard disk drive or solid state storage device (SSD). Further, although shown as a single unit, the storage 230 may be a combination of fixed and/or removable storage devices, such as fixed disc drives, floppy disc drives, tape drives, removable memory cards, optical storage, network attached storage (NAS), or a storage area-network (SAN).

Illustratively, the memory 225 stores an enterprise IT management tool 221, which itself includes a query tool 222, a graphical user interface 224, a monitoring component 226 and a semantic graph generator 228. And storage 230 stores a semantic graph 232, an ontology definition 234 and an information asset database 236. In one embodiment, the management tool 221 provides a software application configured to allow users to search for information assets, monitor users navigating search results and build a semantic graph 232. Thus, the semantic graph 232 provides a representation of the relationships among information assets stored by the information asset database 236 learned by observing user behavior.

The monitoring component 226 may monitor a user navigating through search results and update or evolve the semantic graph 232 based on user navigation. When a user jumps from one information asset to another listed in search results, the monitoring component 226 can record (or update) an association between a first accessed element from the search results and a second accessed element. In one embodiment, for such an association to be recorded, the user may need to jump from the first information asset to the second information asset within a specified amount of time. While the time may be configured as a matter of preference, specific values may be set on a case-by-case basis. For example, assume a user queries for assets and is presented with a paginated result-set spanning hundreds of pages. As the user scans through the first page, hoping to find the wanted assets, the user notices a potential match and clicks on it for details. After going through the asset details, the user (reasoning from his experience or domain knowledge) decides that to view a related asset. Following this, the user returns back to the paginated results and starts scanning through pages. Within the next few seconds (say less than ten seconds), the user spots another asset and clicks on it. And after doing so, spends between 2-5 minutes reading the details of this second asset and then, returns to the paginated results. In this scenario, two different thresholds for time-periods are may be set. The first one is an upper threshold (desirable behavior is that the user 'quickly' clicks another related asset). However, the second one is a lower threshold (desirable behavior is that the user spends 'considerable' time reading the second asset). If instead, the user returns back to the paginated results too quickly (as specified by the second threshold), then the monitoring component 226 may determine that there is no relationship between the first and second asset. Of course, one of ordinary skill in the art will recognize that the threshold (or thresholds) may be set in a variety of ways.

Once a specified number of users have traversed the same path between information assets, i.e., have accessed the first and second information assets in search results using the same sequence in a manner that satisfies the thresholds selected for a particular case, the semantic graph generator 228 may add a permanent semantic association between two information assets in the semantic graph 232.

Once generated, the management tool 221 may present users with an indication of relationships between information assets reflected in the semantic graph 232 when users navigate search results. To that end, graphical user interface 224 may allow users to specify query terms used to by the query tool 222 to search the information asset database 236. For example, the interface 224 may provide a text box which allows users to specify keywords (or other attributes) of a set of information assets a user is looking for. Once executed, the results of the query are presented in the interface 224. For example, the interface 224 may present a list of information assets sorted by name, type, location, category, etc., or ranked according relevance. In one embodiment, e.g., the most relevant information assets may be determined as the assets in the results with the greatest number of edges in the semantic graph 232. Further, when a user selects one information asset, the interface may access the semantic graph 232 to identify edges to other, related information assets, and present the user with an indication of the related assets.

The ontology 234 may be used to infer additional relationships between information assets and further evolve the semantic graph 232. For example, the information asset database 236 may include a variety of descriptive metadata about a given information asset, e.g., a name, a set of semantic tags, keywords, summaries, etc. In one embodiment, the ontology 234 may be used normalize the information asset metadata to a common form specified by the particular domain ontology. Doing so allows related information assets to be identified based on the normalized terms from the ontology 234. For example, the semantic graph generator 228 may add new edges to reflect relationships identified using the ontology 234, perform transitive closures, sub or super-relationship inference, etc.

Figure 3:
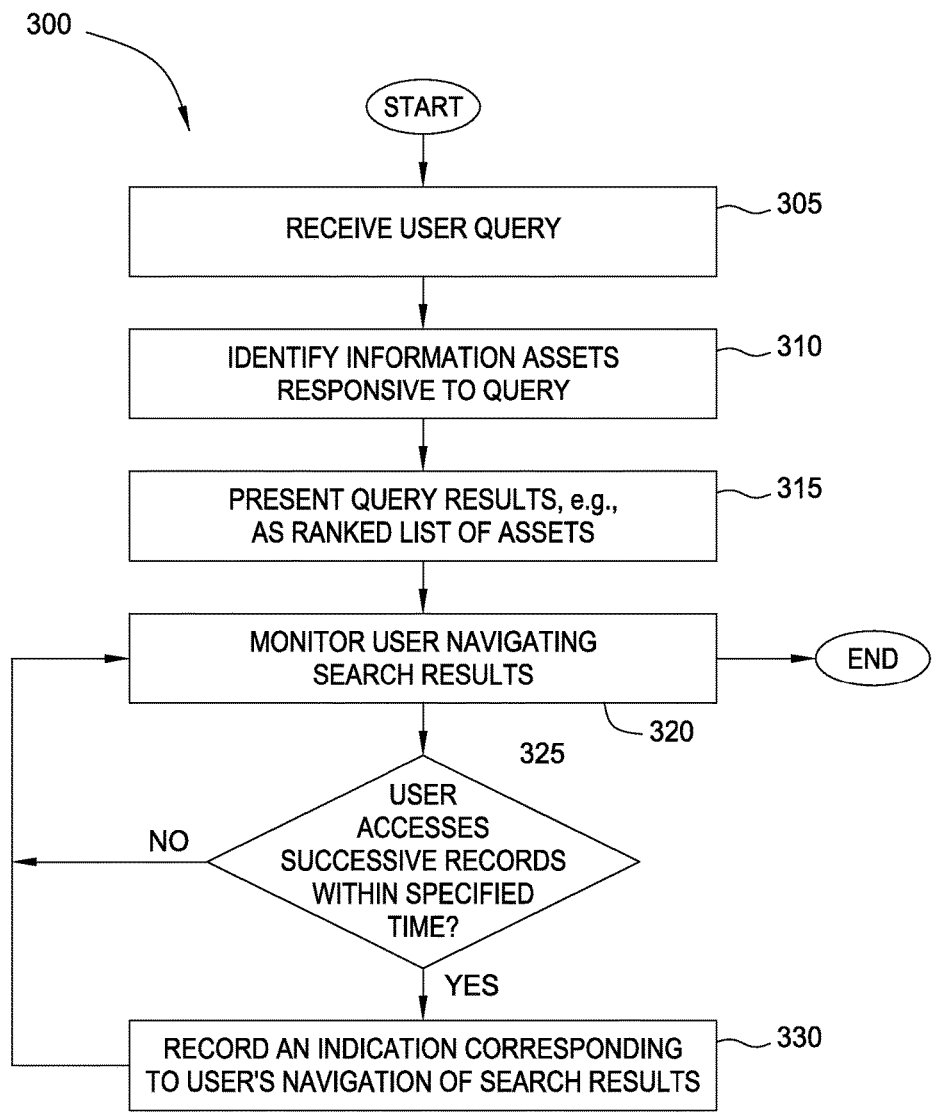
FIG. 3 illustrates a method for monitoring user interactions with search results in order to identify and share relationships about information assets within an enterprise, according to one embodiment of the invention.

FIG. 3 illustrates a method 300 for monitoring user interactions with search results in order to identify and share relationships about information assets within an enterprise, according to one embodiment of the invention. As shown, the method 300 begins at step 305 where the management tool receives a user query. As noted, such a query may include a set of user specified keywords describing the information assets a user is looking for. However, such a query could also be specified using attributes of the sought after information assets, specified, e.g., by asset type, class, or category, or combinations of both. At step 310, the management tool identifies a set of information assets responsive to the query, and the results are then presented to a user at step 315. As noted, the graphical interface provided by the management tool may present a list of information assets sorted by name, type, location, category, etc.

At step 320, the management tool may begin to monitor a user interacting with the list of search results presented at step 315. At step 325, should the user access successive records in the result set within a specified time, then at step 330, the management tool records an indication of an association between two such assets. The monitoring at step 320 continues so long as a user navigates a given set of search results. Further, method 300 may be repeated for new searches by the same user as well as other users. Doing so allows the wisdom across multiple users in an enterprise to be captured over time. For example, the management tool may present users with related information assets when presenting search results.

Figure 4:
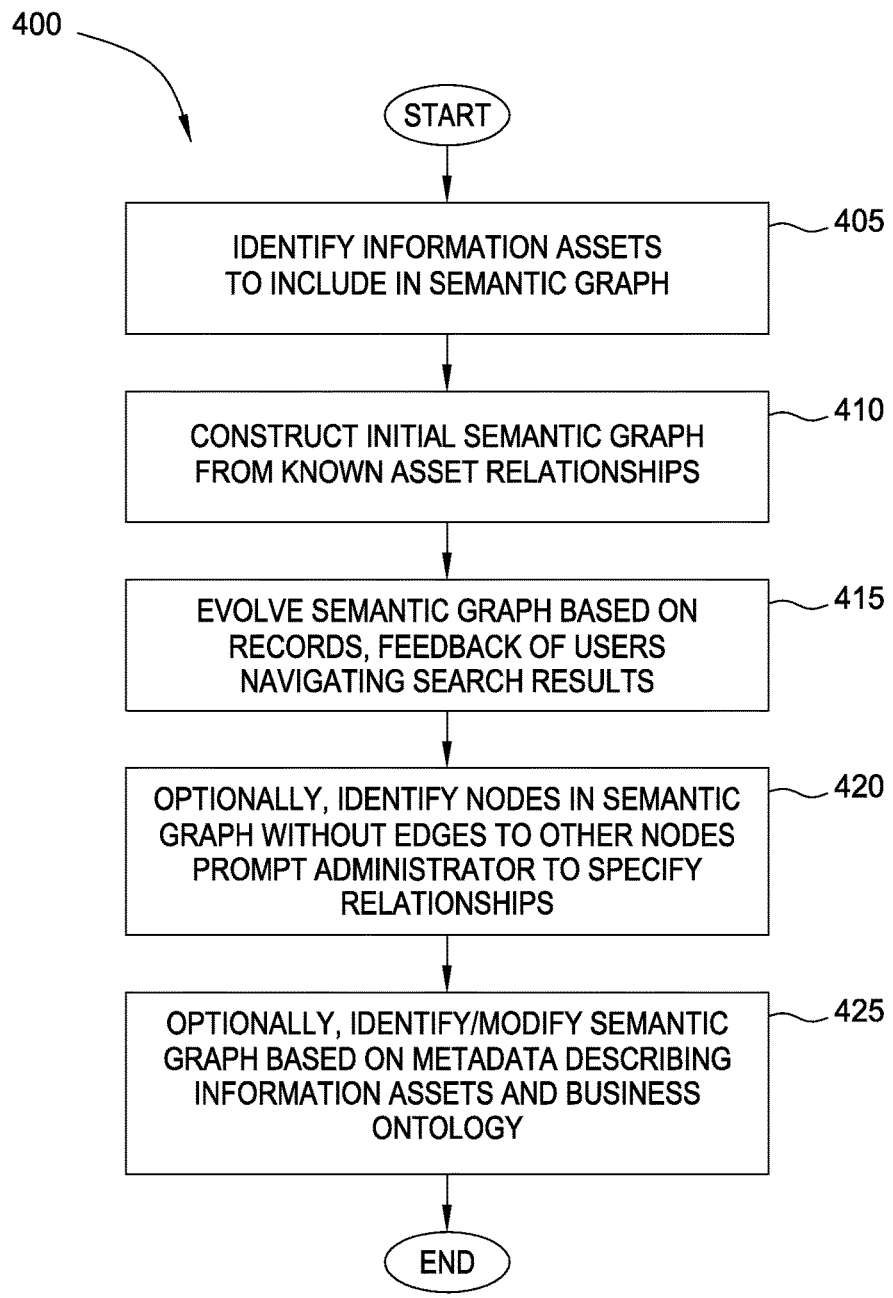
FIG. 4 illustrates a method for generating a semantic graph capturing relationships between information assets, according to one embodiment of the invention.

FIG. 4 illustrates a method 400 for generating a semantic graph representing relationships between information assets, according to one embodiment of the invention. As shown, the method 400 begins at step 405, where the semantic graph generator identifies information assets to include in the semantic graph. While this may include all of the assets in a given enterprise, it can also be limited to assets of a user-specified type, category or designation. For example, a semantic graph could be generated using only the "production" or "development" information assets of an enterprise.

At step 410, the semantic graph generator may build an initial semantic graph from known relationships between information assets. For example, using the method 300, over time, a series of relationships between information is identified while monitoring user behavior. In one embodiment, each such relationship is used to create an edge in the semantic graph. Further, each such edge may be assigned a weight, increased each time the path between the two particular assets is followed by a user. Once the weight on a given edge passes a user-specified threshold, a meaningful relationship between the nodes connected by the edge is presumed to have been identified. That is, the two information assets connected by the edge are related in a manner that is meaningful to users, as reflected in the history of multiple users navigating different search results. As another example the graph generator may create edges based on the relative strengths of the edges exiting a given node. For example, if one node includes many edges connected to other nodes, but includes one edge having a weight that exceeds all the others by a configurable threshold, then this edge may be modified into a permanent semantic association, while others are discarded.

Once generated, the edges in the semantic graph may be used to enhance the presentation of search results to a user. At step 415, the graph generator may evolve or update the semantic graph based on additional recorded feedback of users interacting with search results. That is, the semantic graph may continue to evolve over time, as new information assets are identified and new certain paths are reinforced in response to users interacting with search results.

The graph generator may perform optional steps 420 and 425 to modify the semantic graph generated at steps 410 and 415. At step 420, the graph generator may identify nodes on the semantic graph without any edges to other nodes (or no edges that exceed a user-configurable threshold). Once identified, the graph generator may prompt an administrator to specify any desired edges from the identified nodes to other nodes in the semantic graph (or to prune such isolated nodes from the semantic graph). At step 425, the graph generator may identify or modify nodes in the semantic graph based on a domain ontology. As noted, such an ontology may allow related information assets to be identified from the normalized terms from the ontology. For example, the semantic graph generator may add, modify or remove edges to the semantic graph in order to reflect relationships identified using the ontology.

Figure 5A:
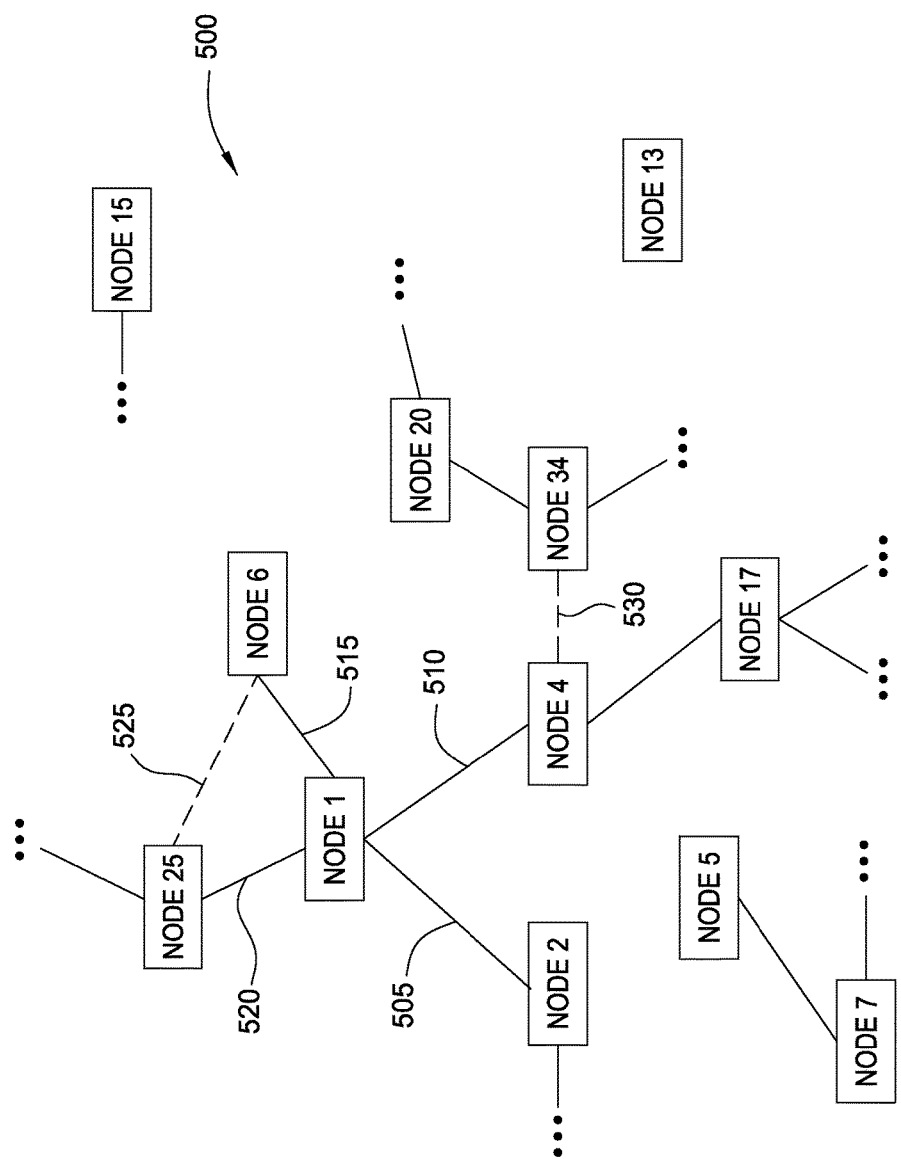
FIG. 5A illustrates an example of semantic graph generated/evolved by monitoring users navigating through a paginated list of search results using the methods of FIGS. 3 and 4, according to one embodiment of the invention.

FIG. 5A illustrates a portion of a semantic graph 500 generated and evolved by monitoring users navigating through a paginated list of search results using the methods of FIGS. 3 and 4, according to one embodiment of the invention. As shown, the graph 500 includes multiple nodes. Each node represents an information asset of an enterprise related to others by edges. In this example, an edge 505 connects node 1 to node 2, an edge 510 connects node 1 to node 4, an edge 515 connects node 1 to node 6, and an edge 520 connects node 1 to node 25. Other edges in the semantic graph connect nodes as illustrated in FIG. 5A. An edge connecting two nodes in graph 500 represents a relationship between those nodes created by the semantic graph generator in performing the method 400, as discussed above. Each node may have an associated weight indicating the relative strengths of the learned relationship between nodes.

Figure 5B:
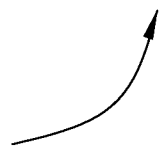
FIG. 5B illustrates an example of information assets presented as query results, according to one embodiment of the invention.

FIG. 5B illustrates an example of information assets presented as query results 550, according to one embodiment of the invention. As shown, query results 550 are presented as an ordered list of information assets (labeled as elements e_1 through e_36). The ordered lists results 550 are also divided into six pages, and may be presented using any suitable graphical user interface. Assume for this example that the numerical values of the nodes of semantic graph 500 of FIG. 5A correspond to the numeric values in elements of list 550.

As noted, while the user interacts with the search results 550, the relationships between nodes in the semantic graph 500 may be used to update semantic graph 500 as well as present the user with an indication of related information assets. For example, assume the user presented with search results 550 first accesses node 1. In response, the interface may be updated to indicate that nodes 2, 4, 6 and 25 are related to node 1. Doing so may encourage the user to favor the related assets when navigating the search results, as well as simply help the user understand what information assets are related to a selected one.

Further, the semantic graph may be updated based on the path a user takes while navigating search results 550. For example, assume the user presented with search results 550 first accesses element e_4 (corresponding to node 4 of graph 500) and then accesses element e_34 (corresponding to node 34 of graph 500). In such a case, the semantic graph 500 may be updated with an edge 530 between node 4 and node 34. The weight assigned to edge 530 may be increased as other users navigate between the information assets associated with nodes 4 and 34. Once the weight assigned to edge 530 exceeds a user-specified threshold, then edge 530 may be updated as a permanent semantic link relating nodes 4 and 34.

Similarly, as noted above, a domain ontology or other logical inferences may be used to update and modify the semantic graph 500. For example, assume a transitive closure operation is performed on semantic graph 500. In such a case, as node 1 is related to node 25 (by edge 520) and as node 1 is related to edge node 6 (by edge 515), an edge 525 may be added to the semantic graph 500. That is, as node 1 is related to both node 6 and node 25, node 6 and node 25 may be related to one another. In one embodiment, the transitive relationship between node 6 and node 25 (represented by edge 525) may need to be confirmed by an administrator prior to a permanent semantic association being created.

Figure 6:
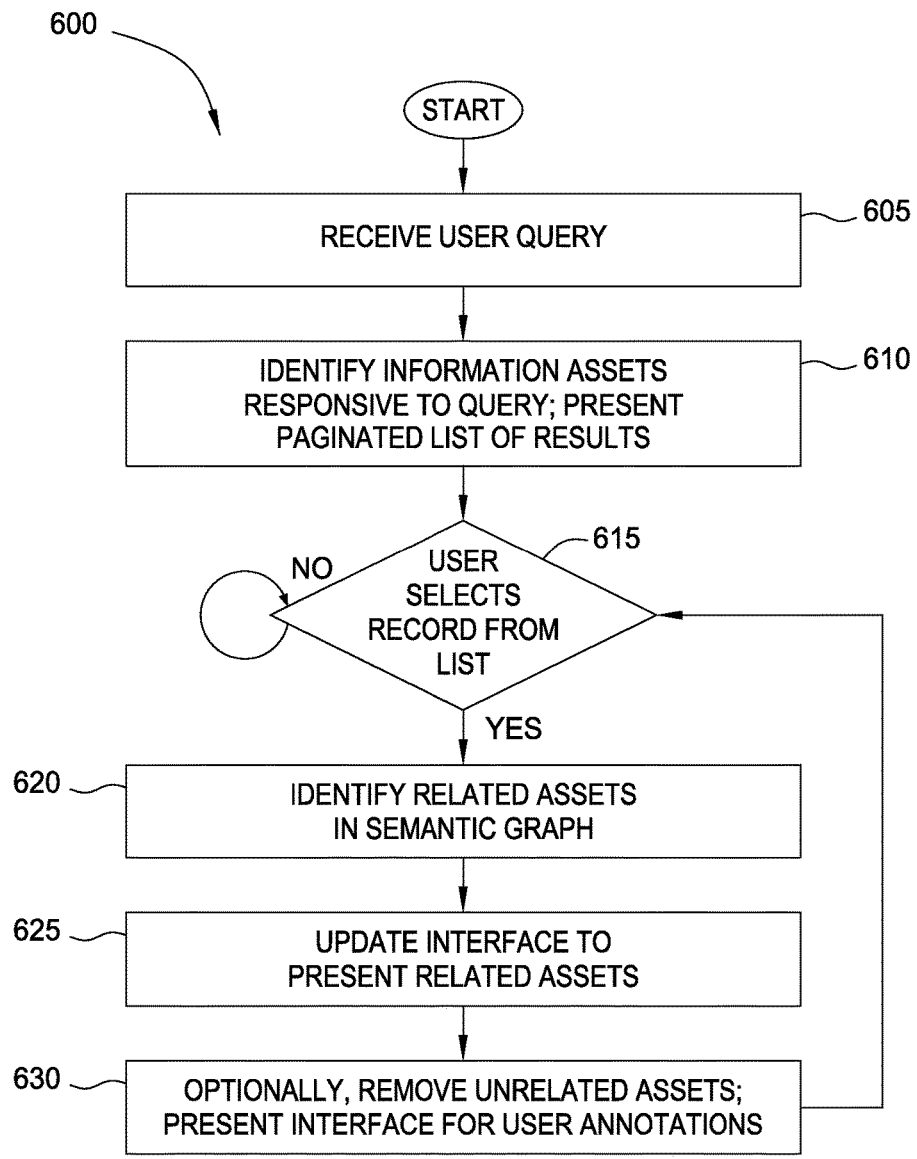
FIG. 6 illustrates a method for presenting a user navigating search results with information about asset relationships identified using a semantic graph, according to one embodiment of the invention.

FIG. 6 illustrates a method 600 for presenting a user navigating search results with information about asset relationships identified using a semantic graph, according to one embodiment of the invention. As shown, the method 600 begins at step 605, where the enterprise information management tool receives a user query. As noted, such a query may include a set of user specified keywords describing the information assets a user is looking for. At step 610, the management tool identifies a set of information assets responsive to the query and the results are then presented to the user.

Once displayed, the management tool waits for the user to select an element from the search results. At step 615, the user selects one of the information assets presented in the search results. At step 620, the management tool identifies assets in the semantic graph related to the one selected at step 625 and updates the interface to present the user with an indication of the related information assets. In one embodiment, related information assets may be identified, in part, based on contextual information about the user (e.g., user role, etc.) submitting the query. That is, the related information assets shown to a given user may tailored based on the relevance of certain assets to that user.

Optionally, at step 630, the management tool may remove unrelated assets from the display as well as present the user with annotations provided by other users characterizing the relationships between information assets. The interface may also allow the user to provide their own annotations or comments regarding the relationship between one information asset and another.

In addition to monitoring users interacting with search results to identify relationships between information assets and to using the identified relationships to enhance subsequent user-navigation of search results, the identified relationships may be used in other ways to manage the information assets of a given enterprise. For example, nodes in the semantic graph having a relatively large number of relationships to other nodes may be readily identified as relatively "important" information assets, as users have navigated to/from such an information asset from many others. By evaluating the information assets that form such "hubs" within the semantic graph, an enterprise can identify assets that should be formally administered and managed or given priority when allocating resources. That is, the common wisdom captured by monitoring users interacting with search results also surfaces assets which are currently unmanaged assets. Conversely, some information assets may have relatively few links to other assets (or none at all). In the case of information assets managed by the enterprise to provide data to certain users, the low utility of such "underperforming" assets may be identified from the semantic graph. Such information assets may be sunset to reduce operating costs in the appropriate case. Thus, the crowd wisdom captured in the semantic graph allows information governance structures within the enterprise to make decisions, such as reconciling relative asset importance to improve operating costs, improve data quality for an information asset which is used often but not formally managed within the enterprise (thus having low data quality or service). The crowd wisdom captured in the semantic graph may also be used to improve compliance issues. For example, rarely used assets which are not properly managed containing sensitive data might expose sensitive data to the risk of non-compliance with legal requirements.

Figure 7:
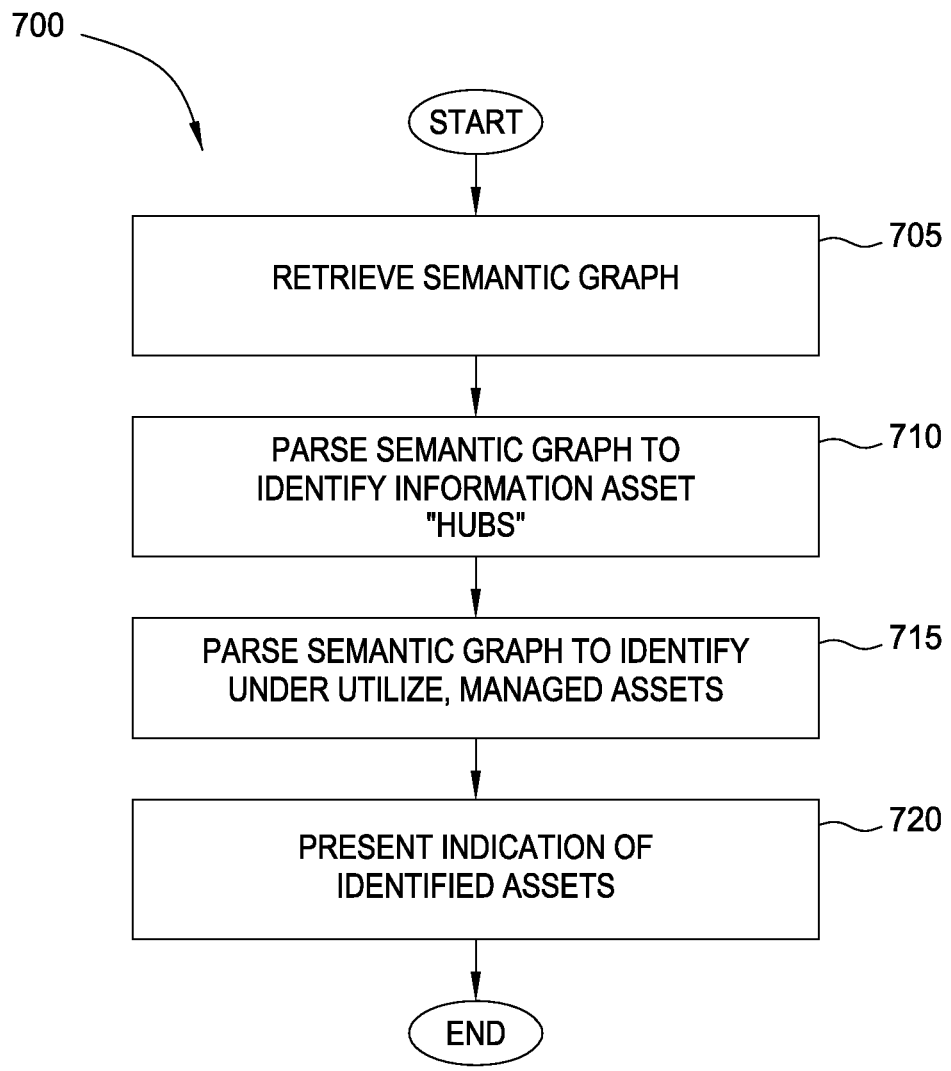
FIG. 7 illustrates a method for identifying information assets within an enterprise, according to one embodiment of the invention.

FIG. 7 illustrates a method 700 for identifying information assets within an enterprise, according to one embodiment of the invention. As shown, the method 700 begins at step 705, where the management tool retrieves the current semantic graph for a given set of information assets within the enterprise. As noted, the semantic graph may be generated according to the method 400 of FIG. 4.

At step 710, the management tool may traverse the nodes of the semantic graph to identify information asset "hubs," i.e., information assets with a specified minimum number of edges to other information assets. Once identified, an enterprise may determine the operational state of such assets. For example, some information assets may begin as an ad-hoc local database used by a relatively small group of individuals. However, if such an information asset proves useful, the original group of individuals may share its existence with others outside of the initial group. Subsequently, as other uses search for the local database and navigate to/from this asset in search results, edges to the local database form in the semantic graph. Once an edge count for a given node exceeds the threshold, the enterprise can identify the asset in the semantic graph as one to consider to formalize within the enterprise. Similarly, an enterprise may evaluate an information asset "hub" to determine whether it should be divided into smaller information assets. Doing so may result in information assets having more specialized functions than the information asset "hub," thereby reducing operational dependency on the information asset "hub" itself.

At step 710, the management tool may traverse the nodes of the semantic graph to identify information assets with few (or no) edges to others within the semantic graph. Doing so allows information assets having an edge count that falls below a specified threshold to be identified. As noted, a node having few edges in the semantic graph may indicate that the information asset corresponding to that node may be of limited utility to the enterprise. At step 720, the nodes (and corresponding information assets) identified at step 715 and 720 may be presented to a user.

Advantageously, embodiments of the invention provide an information asset management tool configured to capture and utilize crowd wisdom in order to identify and share relationships about information assets within the enterprise. As described above, a semantic graph may be generated by monitoring users navigating through search results which provide a set of information assets responsive to a search query. By recording the navigation path taken by many users, relationships between information assets may be identified. Further, once generated, the semantic graph may be used to present users with an indication of related information assets as part of the search results. Further still, the semantic graph may also be used to identify information asset "hubs" as well as information assets that may provide low utility to individuals within the enterprise.

While the foregoing is directed to embodiments of the present invention, other and further embodiments of the invention may be devised without departing from the basic scope thereof, and the scope thereof is determined by the claims that follow.

What is claimed is:

1. A computer-implemented method for identifying information assets, the method comprising:
    monitoring users navigating query search results, each search result presenting a list of information assets responsive to a corresponding search query, wherein each information asset in the list corresponds to a computing resource available within an enterprise computing network;
    generating, by operation of one or more computer processors, a semantic graph representing relationships between the information assets, wherein nodes of the semantic graph each correspond to one of the information assets, wherein relationships between nodes are identified by monitoring users navigating from one of the information assets presented in the search results to another one of the information assets presented in the search results, and wherein the semantic graph includes metadata specifying an operational state of each information asset as being either a formally managed information asset within the enterprise computing network or an informally managed information asset within the enterprise computing network;
    periodically evaluating the semantic graph using predefined criteria;
    upon determining at least a first one of the plurality of nodes in the semantic graph corresponds to a first information asset which satisfies the predefined criteria and is one of the informally managed information assets within the enterprise computing network, providing an indication of the first node as corresponding to an information asset which is a target for being a formally managed information asset within the enterprise computing network;
    classifying a second one of the plurality of nodes in the semantic graph corresponding to a second information asset as a first hub, based on determining that the second one of the plurality of nodes has a number of edges to other nodes that exceeds a predefined value and upon further determining that the second information asset is a formally managed information asset;
    responsive to classifying the second information asset as the first hub:
        determining to divide the second information asset into a plurality of specialized information assets, wherein each of the plurality of specialized information assets has functionality that is more specialized than functionality of the second information asset;
        dividing the second information asset into the plurality of specialized information assets, wherein each of the plurality of specialized information assets is a formally managed information asset; and
        updating the semantic graph by adding nodes corresponding to the plurality of specialized information assets; and
    classifying a third one of the plurality of nodes in the semantic graph corresponding to a third information asset as a second hub, based on determining that the third one of the plurality of nodes has a number of edges to other nodes that exceeds the predefined value and upon further determining that the second information asset is a formally managed information asset;
    responsive to classifying the third information asset as the third hub:
        assigning a first priority to the third information asset, wherein the first information asset is assigned a relatively lower priority; and
        allocating additional computing resources to the third information asset.

2. The computer-implemented method of claim 1, wherein the predefined criteria specifies a minimum threshold edge count to/from a given one of the plurality of nodes is required to satisfy the predefined criteria.

3. The computer-implemented method of claim 1, wherein the plurality of information assets include at least one of a database system, a web service and a server application.

4. The computer-implemented method of claim 1, wherein monitoring users navigating the query search results comprises:
    presenting a given user with search results responsive to a corresponding one of the search queries;
    monitoring the given user accessing a first one of the information assets identified in the set of search results, and subsequently, accessing a second one of the information assets; and updating a weighted relationship between the first information asset and the second information asset in the semantic graph.

5. The computer-implemented method of claim 4, wherein a weight specified by the weighted relationship is increased each time one of the users navigates from the first information asset to the second information asset, and further comprising, upon determining the weight exceeds a specified threshold, updating the semantic graph with an edge connecting nodes in the semantic graph corresponding to the first information asset and the second information asset.

6. The method of claim 1, further comprising:
periodically evaluating the semantic graph using second predefined criteria; and
upon determining at least a second one of the information assets in the semantic graph satisfies the second predefined criteria and is one of the formally managed information assets within the enterprise computing network, providing an indication of the second information asset as being an underutilized information asset within the enterprise computing network.

7. The method of claim 1, wherein the operational state of each respective information asset is determined based on how formally the respective information asset is administered.

8. The method of claim 1, the method further comprising:
determining that a fourth one of the plurality of nodes in the semantic graph has a number of edges to other nodes that is less than a predefined minimum, wherein the fourth one of the plurality of nodes corresponds to a fourth information asset which is one of the formally managed information assets within the enterprise computing network;
determining to phase out the fourth information asset based on determining that the fourth node has a number of edges to other nodes that is less than the predefined minimum; and
removing the fourth information asset from the enterprise computing network.

9. The method of claim 1, wherein the metadata specifying the operational state of the first information asset classifies the first information asset as being an informally managed asset because the first information asset was created as an ad-hoc local database.

10. A non-transitory computer-readable storage medium storing an application, which, when executed on a processor, performs an operation for identifying information assets, the operation comprising:
monitoring users navigating query search results, each search result presenting a list of information assets responsive to a corresponding search query, wherein each information asset in the list corresponds to a computing resource available within an enterprise computing network;
generating, by operation of one or more computer processors, a semantic graph representing relationships between the information assets, wherein nodes of the semantic graph each correspond to one of the information assets, and wherein relationships between nodes are identified by monitoring users navigating from one of the information assets presented in the search results to another one of the information assets presented in the search results, and wherein the semantic graph includes metadata specifying an operational state of each information asset as being a formally managed information asset within the enterprise computing network or an informally managed information asset within the enterprise computing network;
periodically evaluating the semantic graph using predefined criteria;
upon determining at least a first one of the plurality of nodes in the semantic graph corresponds to first information asset which satisfies the predefined criteria and is one of the informally managed information assets within the enterprise computing network, providing an indication of the first node as corresponding to an information asset which is a target for being a formally managed information asset within the enterprise computing network;
classifying a second one of the plurality of nodes in the semantic graph corresponding to a second information asset as a first hub, based on determining that the second one of the plurality of nodes has a number of edges to other nodes that exceeds a predefined value and upon further determining that the second information asset is a formally managed information asset;
responsive to classifying the second information asset as the first hub;
determining to divide the second information asset into a plurality of specialized information assets, wherein each of the plurality of specialized information assets has functionality that is more specialized than functionality of the second information asset;
dividing the second information asset into the plurality of specialized information assets, wherein each of the plurality of specialized information assets is a formally managed information asset; and
updating the semantic graph by adding nodes corresponding to the plurality of specialized information asset; and
classifying a third one of the plurality of nodes in the semantic graph corresponding to a third information asset as a second hub, based on determining that the third one of the plurality of nodes has a number of edges to other nodes that exceeds the predefined value and upon further determining that the second information asset is a formally managed information asset;
responsive to classifying the third information asset as the third hub:
assigning a first priority to the third information asset, wherein the first information asset is assigned a relatively lower priority; and
allocating additional computing resources to the third information asset.

11. The computer-readable storage medium of claim 10, wherein the predefined criteria specifies a minimum threshold edge count to/from a given one of the plurality of nodes is required to satisfy the predefined criteria.

12. The computer-readable storage medium of claim 10, wherein the plurality of information assets include at least one of a database system, a web service and a server application.

13. The computer-readable storage medium of claim 10, wherein monitoring users navigating the query search results comprises:
presenting a given user with search results responsive to a corresponding of the search queries;
monitoring the given user accessing a first one of the information assets identified in the set of search results, and subsequently, accessing a second one of the information assets; and updating a weighted relationship between the first information asset and the second information asset in the semantic graph.

14. The computer-readable storage medium of claim 13, wherein a weight specified by the weighted relationship is increased each time one of the users navigates from the first information asset to the second information asset, and wherein the operation further comprises, upon determining the weight exceeds a specified threshold, updating the semantic graph with an edge connecting nodes in the semantic graph corresponding to the first information asset and the second information asset.

15. A system, comprising:
a processor; and
a memory storing an enterprise information asset management application program, which, when executed on the processor, performs an operation for identifying information assets, the operation comprising:
monitoring users navigating query search results, each search result presenting a list of information assets responsive to a corresponding search query, wherein each information asset in the list corresponds to a computing resource available within an enterprise computing network,
generating, by operation of one or more computer processors, a semantic graph representing relationships between the information assets, wherein nodes of the semantic graph each correspond to one of the information assets, and wherein relationships between nodes are identified by monitoring users navigating from one of the information assets presented in the search results to another one of the information assets presented in the search results, and wherein the semantic graph includes metadata specifying an operational state of each information asset as being a formally managed information asset within the enterprise computing network or an informally managed information asset within the enterprise computing network,
periodically evaluating the semantic graph using predefined criteria,
upon determining at least a first one of the plurality of nodes in the semantic graph corresponds to a first information asset which satisfies the predefined criteria and is one of the informally managed information assets within the enterprise computing network, providing an indication of the first node as corresponding to an information asset which is a target for being a formally managed information asset within the enterprise computing network;
classifying a second one of the plurality of nodes in the semantic graph corresponding to a second information asset as a first hub, based on determining that the second one of the plurality of nodes has a number of edges to other nodes that exceeds a predefined value and upon further determining that the second information asset is a formally managed information asset;
responsive to classifying the second information asset as the first hub:
determining to divide the second information asset into a plurality of specialized information assets, wherein each of the plurality of specialized information assets has functionality that is more specialized than functionality of the second information asset;
dividing the second information asset into the plurality of specialized information assets, wherein each of the plurality of specialized information assets is a formally managed information asset; and
updating the semantic graph by adding nodes corresponding to the plurality of specialized information assets; and
classifying a third one of the plurality of nodes in the semantic graph corresponding to a third information asset as a second hub, based on determining that the third one of the plurality of nodes has a number of edges to other nodes that exceeds the predefined value and upon further determining that the second information asset is a formally managed information asset;
responsive to classifying the third information asset as the third hub:
assigning a first priority to the third information asset, wherein the first information asset is assigned a relatively lower priority; and
allocating additional computing resources to the third information asset.

16. The system of claim 15, wherein the predefined criteria specifies a minimum threshold edge count to/from a given one of the plurality of nodes is required to satisfy the predefined criteria.

17. The system of claim 15, wherein the plurality of information assets include at least one of a database system, a web service and a server application.

18. The system of claim 15, wherein monitoring users navigating the query search results comprises:
presenting a given user with search results responsive to a query to a corresponding one of the search queries;
monitoring the given user accessing a first one of the information assets identified in the set of search results, and subsequently, accessing a second one of the information assets; and
updating a weighted relationship between the first information asset and the second information asset in the semantic graph.

19. The system of claim 18, wherein a weight specified for the weighted relationship is increased each time one the users navigates from the first information asset to the second information asset, and wherein the operation further comprises, upon determining the weight exceeds a specified threshold, updating the semantic graph with an edge connecting nodes in the semantic graph corresponding to the first information asset and the second information asset.

* * * * *